United States Patent Office 2,771,058
Patented Nov. 20, 1956

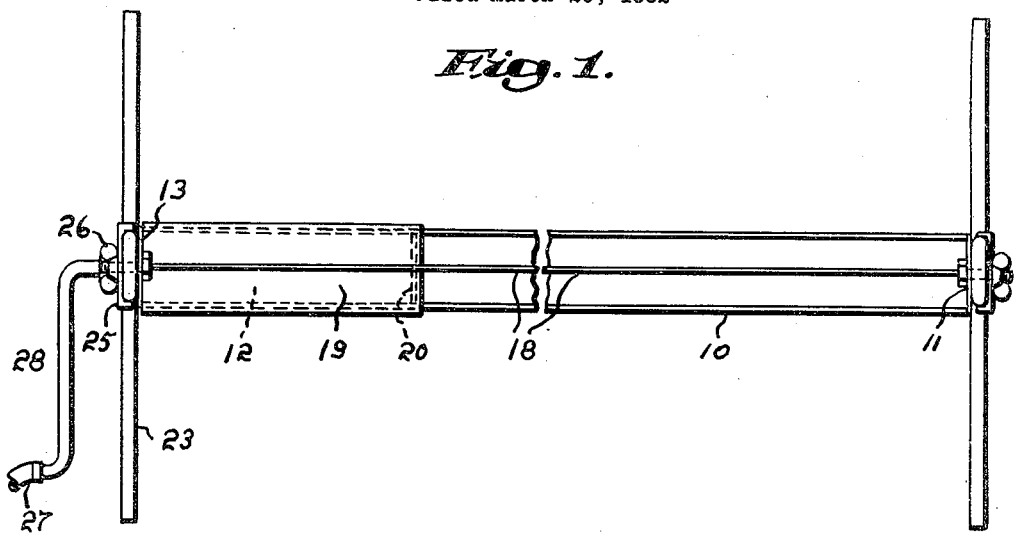
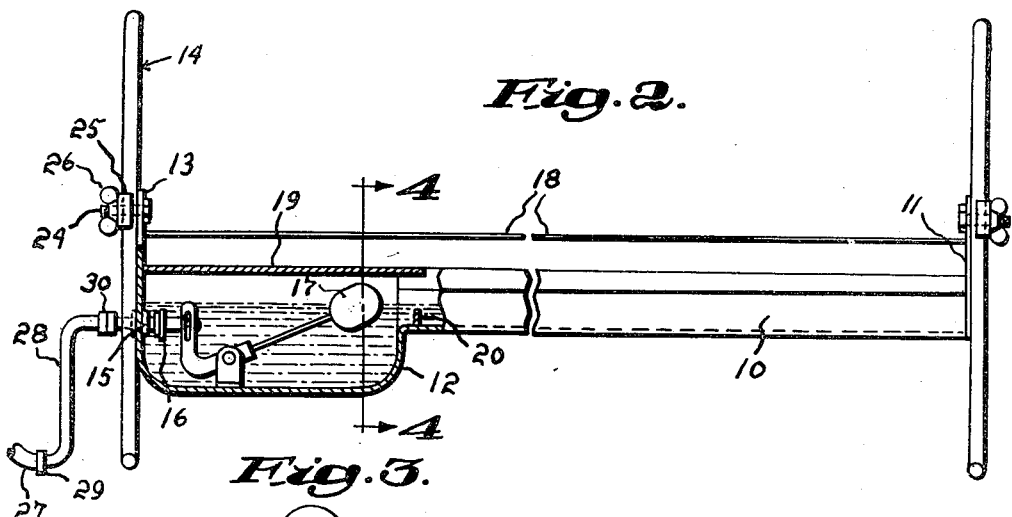
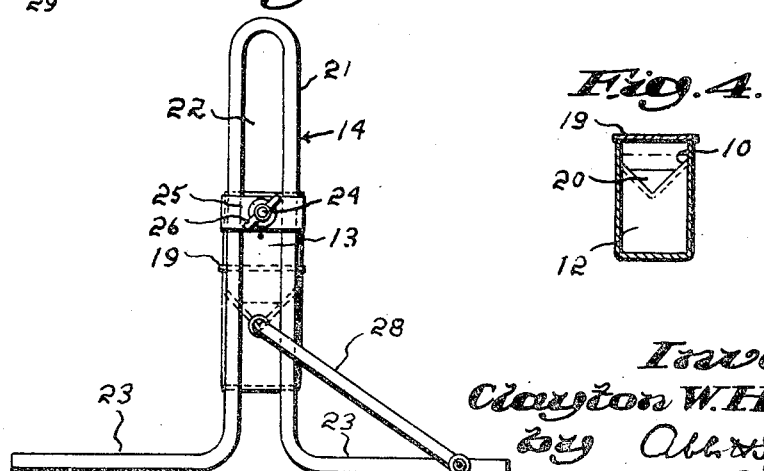
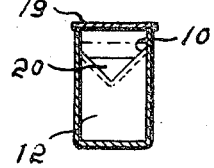

2,771,058

POULTRY WATERING DEVICE

Clayton W. Howard, Thomaston, Maine

Application March 20, 1952, Serial No. 277,625

3 Claims. (Cl. 119—78)

This invention relates to poultry watering devices and particularly to such devices where the water level in the troughs is constantly maintained by a float operated valve in control of the water supply conduit.

It will be appreciated that it is necessary to supply poultry with all the clear drinking water that they need and that, particularly when flocks of large size are to be cared for, watering devices, the water supply conduits to which have float operated control valves, are of obvious advantage. In order for the advantages of this type of watering devices to be realized, they must be adjustable to meet the requirements of the birds as they grow in size and they must be adapted to give reliable and satisfactory operation with a minimum of attention.

With all types of poultry watering devices, difficulty is experienced in keeping them clean due to the fact that birds carry food into the troughs and stand on them and contaminate the water with their droppings. In poultry watering devices having their water level constantly maintained by float operated valves, the float chamber, which must be kept clean, are difficult to service, and foreign particles find their way from the troughs into the float chambers.

The objectives of this invention are to provide poultry watering devices that require a minimum of service and that are adaptable to all requirements as to installation and use. In accordance with it, a poultry watering device consists of a trough opening into a chamber in which the float controlled valve of the water supply conduit is located. A barrier, preferably porous, is located in the trough adjacent the float chamber to prevent the passage thereto of foreign particles in the trough.

In order to minimize the entrance of foreign particles into the device, means are employed to prevent the birds from standing on either the trough or the chamber and usually a cover is provided for the chamber. In practice, the chamber cover overlies the barrier.

A single float chamber may have a plurality of troughs connected to it and each trough may consist of sections. Preferably troughs and chambers are formed of materials that resist corrosion as conditions attendant the raising of poultry unavoidably tend to be corrosive.

Each chamber and its trough or troughs may be provided with base structure to which they are connected for vertical adjustment as a unit and the water supply conduit includes a portion enabling a part of it to move vertically with the unit without interference with that part of the conduit that is disposed on the surface on which the base structure rests.

In the accompanying drawings, an embodiment of the invention is shown which illustrates these and other of its novel features and advantages.

In the drawings,

Fig. 1 is a top plan view of a poultry watering device in accordance with the invention, Fig. 2 is a partly sectioned side view thereof, Fig. 3 is a view of the end thereof to which the water supply conduit is connected, and Fig. 4 is a section along the indicated lines 4—4 of Fig. 2.

In the embodiment of the invention shown in the drawings, there is a trough 10 having at one end a support 11 and its other end in communication with the upper part of the chamber 12 which is also provided with an end support 13. The supports 11 and 13 are adjustably connected to supporting standards, generally indicated at 14, as will subsequently be fully described.

A fitting 15 extends through the wall 13 and into the chamber 12 where it is provided with a valve 16 controlled by a float 17 operable to maintain a predetermined water level in the chamber 12 and in the trough 10. The other end of the fitting 15 is exposed to be connected to the water conduit.

A wire 18 connected to the supports 11 and 13 extends above the trough 10 so as not to interfere with the birds drinking therefrom but to prevent them from sitting thereon. While the wire 18 also prevents the birds from standing on the walls of the chamber 10 or jumping on the float 17, a frequent cause of flooding, the chamber 10 has a removable cover 19 to keep out dirt.

The cover 19 extends for a short distance over the adjacent end of the trough 10 to overlie the barrier 20 which functions to prevent grain, commonly dropped by the birds into the trough 10, from entering the float chamber 12. The upper edge of the barrier 20 shown as slightly below the indicated water level maintained by the float controlled valve 16 and in practise it is porous. Although any water permeable material may be used, webbing is highly satisfactory for use for barriers as it enables water to flow freely therethrough but prevents the passage of foreign particles into the chamber 12.

In practice, troughs of V-shaped sections are preferred as they enable an adequate and readily accessible water supply to be maintained with a relatively small volume of water. In addition, such troughs present grain that the birds have dropped therein so that it may be easily eaten by them, thus minimizing grain waste.

With reference to the connection between the supports and the standards, it will be noted that each standard is shown as including a downwardly opening U-shaped part 21, establishing a vertically disposed open-ended slot 22, and extremities 23 disposed as supporting legs. Each support has a threaded member 24 which extends outwardly through a slot 22 to receive a clamping member 25 and a wing nut 26. Preferably the clamping member 25 is U-shaped to straddle the part 21. By this construction, the trough 10 and the float chamber 12 may be raised or lowered as a unit as required by the size of the birds being cared for.

It will be noted that the fitting 15 extends through the slot 22 of the standard at the chamber end of the device. The water conduit 27 includes an intermediate portion 28 to enable vertical adjustments of the trough to be made without interference from that part of the conduit that is disposed on the surface on which the device rests. The water conduit may be flexible hose or metal pipe. In the latter case, swivel joints 29 and 30 are provided but these are not necessary when a hose is employed.

It will thus be apparent that poultry watering devices in accordance with the invention minimize service and are well adapted to meet a wide range of requirements.

What I therefore claim and desire to secure by Letters Patent is:

1. In a poultry watering device, a trough including first and second portions, said first portion being of V-shaped section to provide that grain introduced into the trough water by the poultry is linearly concentrated to encourage the poultry to eat it, said second section being a water inlet chamber whose bottom is located below the bottom of said first section, a barrier in said first section adjacent said second section to retain entrant grain in said first section, and a cover for said second section including a portion overlying said barrier.

2. In a poultry watering device, a trough including first and second portions of uniform width at their top, said first portion being of V-shaped section to provide that grain introduced into the trough water by the poultry is linearly concentrated to encourage the poultry to eat it, said second section being a water inlet chamber whose bottom is located below the bottom of said first section, a barrier in said first section adjacent said second section to retain entrant grain in said first section, and a cover for said second section including a portion overlying said barrier.

3. In a poultry watering device, a trough including first and second portions, said first portion being of V-shaped section to provide that grain introduced into the trough water by the poultry is linearly concentrated to encourage the poultry to eat it, said second section being a water inlet chamber whose bottom is located below the bottom of said first section, a barrier in said first section adjacent said second section to retain entrant grain in said first section, and a cover for said second section including a portion overlying said barrier, and a wire extending from end to end of said trough in spaced relation to the top thereof.

References Cited in the file of this patent

UNITED STATES PATENTS

| | | |
|---|---|---|
| 1,506,336 | Combellick | Aug. 26, 1924 |
| 1,640,292 | Petrick | Aug. 23, 1927 |
| 1,816,684 | Liechty | July 28, 1931 |
| 1,900,604 | Gustafson | Mar. 7, 1933 |
| 2,274,678 | Eliason | Mar. 3, 1942 |
| 2,338,072 | Quinn | Dec. 28, 1943 |
| 2,477,138 | Olson | July 26, 1949 |
| 2,517,865 | Gilmour | Aug. 8, 1950 |
| 2,570,694 | Langebahn | Oct. 9, 1951 |
| 2,614,532 | Steel | Oct. 21, 1952 |